United States Patent
Jensen

[19]

[11] Patent Number: 6,078,356
[45] Date of Patent: Jun. 20, 2000

[54] FREQUENCY MULTIPLEXED DATA FROM DETECTOR ARRAY

[75] Inventor: William E. Jensen, San Pedro, Calif.

[73] Assignee: Raytheon Company, Los Angeles, Calif.

[21] Appl. No.: 07/895,070

[22] Filed: Jun. 8, 1992

[51] Int. Cl.[7] .............................. H04N 5/33; H04J 14/02
[52] U.S. Cl. ......................... 348/164; 359/132; 359/259; 250/332
[58] Field of Search .............................. 358/213.11, 226, 358/108, 110, 113; 250/332, 349, 208.1; 340/517, 531, 565; 359/115, 123, 133, 152, 154, 162, 180, 182, 132; 370/69.1, 112, 113; 348/164, 166, 294, 297, 302, 303

[56] References Cited

U.S. PATENT DOCUMENTS

| | | | |
|---|---|---|---|
| 3,804,976 | 4/1974 | Gard | 178/6.8 |
| 4,012,633 | 3/1977 | Huntley | 250/199 |
| 4,221,932 | 9/1980 | Anglikowski | 359/182 |
| 4,399,564 | 8/1983 | Cowen | 359/162 |
| 4,810,978 | 3/1989 | Sato | 332/7.51 |
| 4,941,208 | 7/1990 | Olshansky et al. | 455/618 |
| 5,031,234 | 7/1991 | Primas | 359/152 |
| 5,060,225 | 10/1991 | Godfrey | 359/124 |
| 5,153,731 | 10/1992 | Nagasaki et al. | 358/213.11 |
| 5,202,781 | 4/1993 | Heck | 359/152 |
| 5,212,579 | 5/1993 | Huber et al. | 359/182 |

*Primary Examiner*—Andrew I. Faile
*Assistant Examiner*—Andrew B Christensen
*Attorney, Agent, or Firm*—Leonard A. Alkov; William C. Schubert; Glenn H. Lenzen, Jr.

[57] ABSTRACT

A two-dimensional imaging system employs a multiplicity of radiation sensors disposed in an array of rows and columns. In order to couple signals from each of the sensors from an inaccessible location to an accessible location for processing of the sensor signals to produce an image of a subject viewed by the sensors, a fiber optic link employing both frequency multiplexing and frequency modulation of sensor data connects the sensor array with the signal processing equipment. In each column of the array, the sensors produce electrical signals which are coupled via a multiplexer to modulate the frequency of a voltage-controlled oscillator. A plurality of oscillators are provided for the concurrent generation of frequency-modulated signals which are then summed together to produce a composite signal. The composite signal is transmitted via a fiber-optic link to the signal processing equipment wherein the composite signal is demodulated and the frequency contributions of the various sensors are identified. A bank of phase-locked loops may be employed to extract the various frequency components of the composite signal.

12 Claims, 4 Drawing Sheets

FREQUENCY MULTIPLEXED DATA FROM DETECTOR ARRAY

BACKGROUND OF THE INVENTION

This invention relates to the extraction of data from an array of detectors arranged in rows and columns, such as an array of detectors of infrared radiation in an imaging system, and, more particularly, to the use of frequency multiplexing and frequency modulation for communicating data over an optical fiber communication link, this being particularly advantageous for coupling imaging data out of the cold (Dewar) region of an infrared sensor.

Imaging systems constructed of large arrays of detectors are employed in various situations in which it is desired to attain data of a subject electronically by sampling the intensity of radiation in a field of radiation emanating from the subject. A detector element is located on each of numerous sites of a detector array located at the focal plane at which the field of radiation is brought to a focus. Each detector element provides data as to one pixel of an image of the subject. The field of radiation may be swept past the detector array by use of a scanning mirror or, alternatively, the detector elements may be arranged in a two-dimensional array of rows and columns capable of extracting two-dimensional imaging data from a stationary field of radiation. By way of example, there may be 1000, 10,000 or more detector elements in the detector array. In the case of an infrared imaging system, wherein each of the detector elements is a sensor of infrared radiation, it is the practice to construct the detector array within a housing which maintains a cold temperature, the housing having a viewing port through which the incident radiation field enters the housing to be focused upon the detector array. All the data provided by the array of detector elements must be communicated via some form of communication link through a wall of the housing to an external warmer environment wherein the data is processed by filtering or image enhancement, by way of example, to be stored or displayed.

A problem arises in that there are numerous situations wherein the image data changes rapidly, such as in the case of the viewing of a moving object, in which case the many detector elements must be interrogated frequently to update the image data. However, in view of the many detector elements, a frequent updating of the data provided by each of the numerous detector elements presents a considerable burden on the communication link connecting the detector array to the image processing circuitry. As a result, there is a need for a form of communication link which is capable of handling the higher data rates and which is readily connected to the detector elements, even in the case wherein the elements are closely spaced for a high-resolution image.

SUMMARY OF THE INVENTION

The aforementioned problem is overcome and other advantages are provided by an imaging system having an array of radiation sensors arranged in a plurality of columns and wherein, in accordance with the invention, a communication system is provided for extracting imaging data from the columns of sensors. Typically, the columns are straight and are arranged in side-by-side fashion to provide rows of the sensors. However, the practice of the invention is applicable also to arrays of sensors wherein the columns may be curved. In the use of the imaging system, a lens focuses radiation emanating from a subject upon the array of sensors for detecting radiation signal strength at each sensor site of the array. In a preferred embodiment of the invention, the sensors, or detector elements, are arranged on a flat surface disposed at a focal plane of the lens; however, the theory of the invention applies also to arrays of sensors which may be positioned on a curved surface.

The invention provides for a multiplexing of signals from the various sensors, wherein, in one embodiment of the invention, each sensor is associated with a unique band of frequencies to be employed in the communication system and wherein, in each frequency band, a mid-band value of frequency indicates a nominal value of sensor signal with deviations in frequency to either side of the mid-band frequency designating a smaller or a larger value of sensor signal. Thereby, a sum of signals at different frequencies may be transmitted simultaneously via the communication system from the detector array to a distant location for signal processing to extract imaging data. Alternatively, in a second embodiment of the invention, a separate frequency band is designated for each column of sensors, and the sensors in each column are sequentially addressed via time-multiplexing for communicating the data of the sensors of each column sequentially, the data of any one column being transmitted concurrently with the data of the other columns.

In an implementation of an infrared imaging system incorporating the invention, the array of sensors, or detector elements, is located within a cold chamber, and the communication system includes a communication link passing through a wall of the chamber. Preferably, the communication link is an optical link comprising an optical fiber for transmitting an optical signal produced by a light-emitting diode (LED) or a laser diode. Light transmitted via the optical fiber is received by a photodetector such as a PIN diode. Upon detecting the optical signal and conversion of the optical signal to an electrical signal having a plurality of frequency components, the detected signal is applied to a bank of filters such as a plurality of phase-locked loops (PLL) for accurate measurement of the values of frequency in each frequency band or slot. The frequency slot is used to identify a specific sensor or column of sensors, and the value of the frequency within the slot, in terms of deviation from a nominal value of frequency, designates the amplitude of the signal outputted by a sensor. In the case wherein time-multiplexing is employed, the time of arrival of a signal within a specific frequency slot identifies the sensor within a column providing the imaging data. The data provided by each of the sensors is then stored for subsequent display and/or image enhancement.

BRIEF DESCRIPTION OF THE DRAWING

The aforementioned aspects and other features of the invention are explained in the following description, taken in connection with the accompanying drawing wherein.

DETAILED DESCRIPTION

Figure 1:
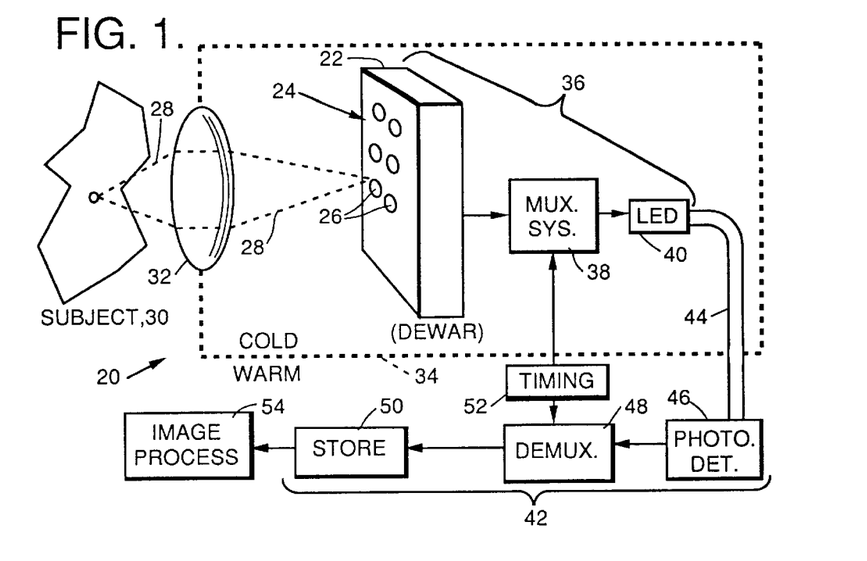
FIG. 1 is a diagrammatic view of an infrared imaging system incorporating the communication system of the invention for extracting data from radiation sensors arranged in rows and columns of a detector assembly.

FIG. 1 shows an imaging system 20 provided with a frequency-multiplexed communication system of the invention wherein individual frequency components are modulated to provide imaging data. The system 20 includes a detector assembly 22 comprising an array 24 of infrared radiation sensors 26 disposed in rows and columns for receiving radiant energy, indicated by rays 28, emanating from a distant subject 30 and focused by an optical system 32 of the system 20 upon the sensors 26. The optical system 32 may be reflective or refractive, and is represented here by a lens. The array 24 of the sensors 26 is located in a focal plane of the optical system 32 such that an image of the subject becomes focused upon the sensor array 24 by the optical system 32. The sensors 26 are operative in the infrared portion of the spectrum, and are enclosed within a housing 34 which maintains a cold environment for operation of the sensors 26 as is well known. A transmission portion 36 of the communication system includes a multiplexing system 38 and a light-emitting diode (LED) 40. The multiplexing system 38 connects the detector assembly 22 to the LED 40 for activating the LED 40 to generate optical signals having imaging data provided by the sensors 26.

The communication system further comprises a reception portion 42 and a fiber optic link 44, the link 44 connecting the reception portion 42 to the transmission portion 36. The reception portion 42 includes a photodetector 46, a demultiplexing system 48 and a memory 50. The photodetector 46 detects optical signals propagating along the link 44, and converts the optical signals to electric signals which are demultiplexed by the system 48 for storage in the memory 50. A timing unit 52 provides timing signals to the multiplexing system 38 and to the demultiplexing system 48 for synchronizing their operations. The fiber optic link 44 passes through a wall of the housing 34 so as to allow the transmission portion 36 to operate at a colder temperature while the reception portion 42 operates at a warmer temperature. Operation of the system 20 is completed by extracting signals from the memory for processing in an image processor 54 for displaying the image. If desired, the processor 54 may include circuitry for enhancing the image in a well-known manner, for example, to smooth certain regions of the image or to sharpen certain regions of the image.

It is noted that the use of the communication system for communicating data from an array of infrared sensors can be employed also, in accordance with the invention, with an array of sensors operating in some other region of the electromagnetic spectrum. For detection of another form of radiation, the cold temperature may not be required, but the detector assembly 22 may still be mounted at a location inaccessible to an image processing apparatus so as to require the communication system of the invention.

Figure 2:
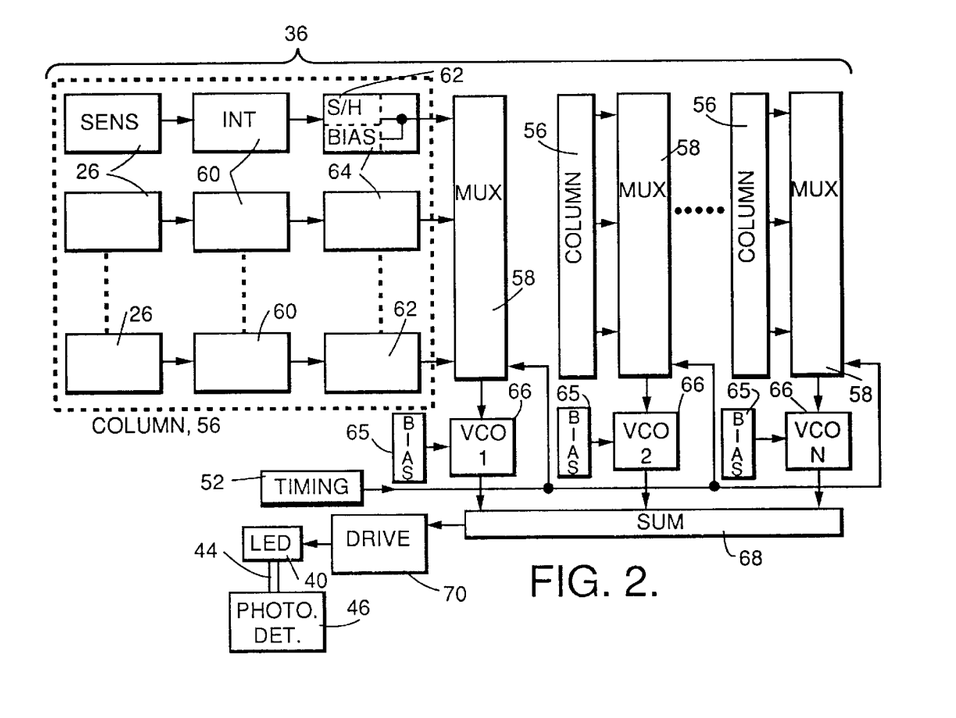
FIG. 2 is a block diagram of a portion of the system of FIG. 1 showing modulation and multiplexing of sensor signals outputted by the detector assembly of FIG. 1.

FIG. 2 shows details in the construction of the transmission portion 36 of the communication system. FIG. 2 shows three columns 56 of the detector assembly 22, by way of example, it being understood that the array 24 of the sensors 26 (FIG. 1) may include many more of the columns 56. The multiplexer system 38 (FIG. 1) comprises plural multiplexers 58 (FIG. 2), coupled to respective ones of the columns 56 of the sensors 26. Within a column 56, each sensor 26 is provided with a signal-processing channel comprising an integrator 60, a sample-and-hold (S/H) unit 62 and a bias circuit 64, the signal-processing channel coupling the sensor 26 to an input terminal of the multiplexer 58. The bias circuit 64 in each of the signal-processing channels is required in only one of the embodiments of the invention, and can be omitted in an alternative embodiment of the invention as will be described hereinafter. The multiplexer system 38 further comprises plural voltage-controlled oscillators (VCO) 66 assigned to respective ones of the columns 56. Also included in the multiplexing system 38 is a summing unit 68 having a set of input terminals connected to respective ones of the VCOs 66 for summing together the VCO signals to produce a composite sum signal. A driver 70 connects an output terminal of the summing unit 68 with an input terminal of the LED 40. For each of the columns 56, the multiplexer 58 applies a control signal to the oscillator 66 to output a sinusoidal signal at a designated frequency to an input terminal of the summing unit 68.

The multiplexers 58 operate in response to timing signals applied by the timing unit 52 to the respective multiplexers 58. The driver 70 amplifies the sum signal to a suitable power level for operating the LED 40. The LED 40 produces a sequence of light pulses in response to the sum signal, the light pulses being coupled via the fiber optic link 44 to the photodetector 46. In FIG. 2, the drawing has been simplified by showing connection of the timing unit 52 only to to the multiplexers 58, it being understood that signals of the timing unit 52 are applied also to the S/H units 62 and to the integrators 60.

In operation, the timing unit 52 establishes sampling intervals for the signal outputted by the sensors 26 in each of the columns 56. During each sampling interval, the signal outputted by a sensor 26 is integrated by an integrator 60 and sampled at the end of the integration interval by an S/H unit 62. Within each of the columns 56, the multiplexer 58 samples respective ones of the signal samples of the sensor signals, and applies the sequence of samples to an input control terminal of the oscillator 66. Three of the oscillators 66 are shown in FIG. 2, the three oscillators 66 being identified by the numerals 1, 2, . . . N. The amplitude of each sample signal establishes a designated frequency of oscillation of the oscillator 66, thereby allowing the oscillator 66 to output sinusoidal signals of designated frequency to the summing unit 68. As the multiplexer 58 cycles through the sequence of sensor signal samples, the frequency of a signal outputted by the oscillator 66 changes in accordance with the magnitude of the signal samples. If desired, each sensor 26 within a column 56 may be identified separately by a nominal value of frequency outputted by the oscillator 66, the nominal value being outputted for a nominal value of signal strength of a sensor signal and serving to designate a frequency slot which identifies a specific sensor 26 of the column 56. The foregoing mode of identification of the sensor 26 is accomplished by use of the bias circuits 64 wherein, in a sensor signal channel, each bias circuit 64 outputs a specific reference value which is summed with the output signal of the S/H unit 62 to provide the nominal value of output signal level for the sensor 26. Deviations from the nominal value provide for a modulation of the frequency within a frequency slot, the frequency deviation designating a magnitude of signal amplitude for the sensor 26.

By way of alternative embodiment, the bias circuits 64 can be eliminated. Alternative bias circuits 65 provide a specific bias voltage inputted to each oscillator 66 so that each oscillator 66 provides a nominal value of frequency which identifies an individual one of the columns 56 of the sensors 26. Within each of the columns 56, identification of specific ones of the sensors 26 is accomplished by use of the timing signals of the timing unit 52 such that each timing signal identifies the interval in which the multiplexer 58 of the column 56 is reading the signal sample of a designated sensor 26. The identification of the signal samples of the specific sensors 26 will be described further with reference to the storing of signal samples in the memory 50 in FIG. 3.

Figure 3:
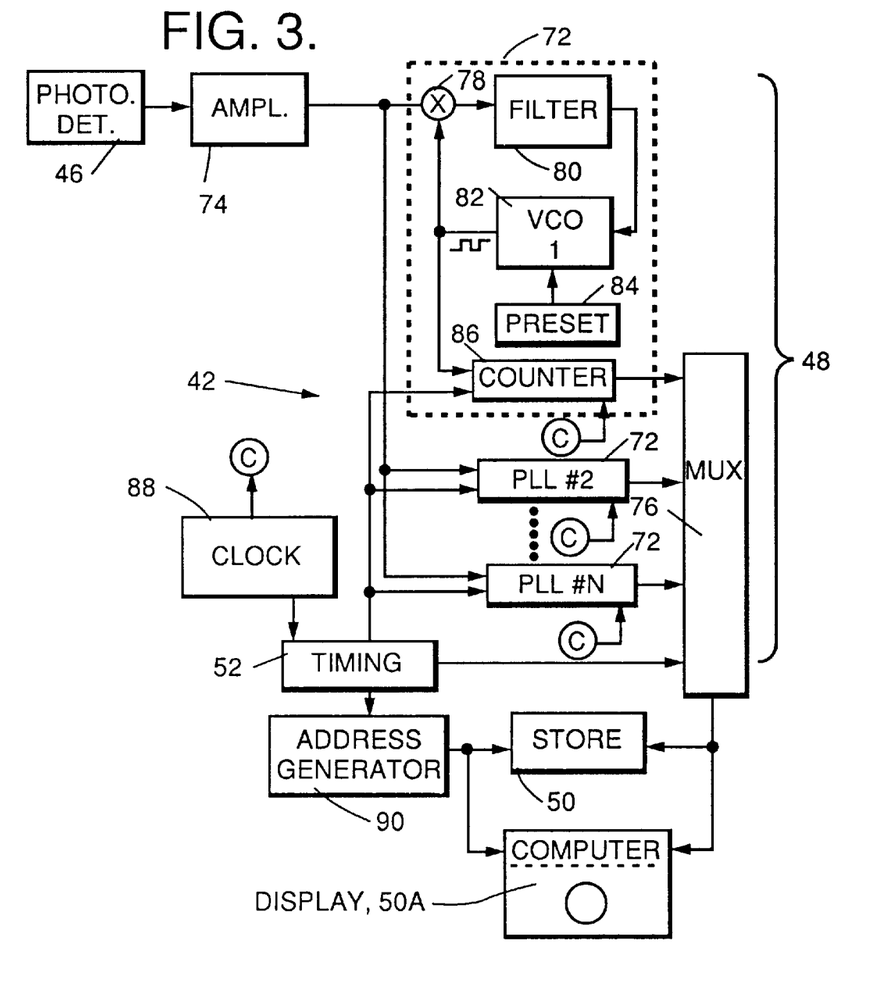
FIG. 3 is a block diagram of a portion of the system of FIG. 1 showing demultiplexing and demodulation of sensor signals outputted by the detector assembly of FIG. 1.

FIG. 3 shows details in the construction of the demultiplexing system 48 of FIG. 1. In FIG. 3, the demultiplexing is accomplished by means of a plurality of phase-locked loops (PLL) 72, there being one PLL 72 for each frequency slot. The input terminals of the respective PLL's 72 are connected together, and are supplied with an output signal of the photodetector 46 by an amplifier 74. The amplifier 74 drives the bank of PLLs 72. Output signals of the PLLs 72 are connected, respectively, to input terminals of a multiplexer 76 which serially connects output signals of the PLLs 72 to the memory 50.

Each PLL 72 comprises a phase detector or multiplier 78, a filter 80 such as a lead-lag filter for control of loop dynamics and a voltage controlled oscillator (VCO) 82. In operation, an output signal of the oscillator 82 is multiplied by an output signal of the amplifier 74 at the multiplier 78 to produce a loop error signal which is filtered by the filter 80 and applied to an input control terminal of the oscillator 82. Such operation of a PLL is well-known. In the use of the bank of PLLs 72, respective ones of the PLLs 72 are preset to operate at different ones of the frequency slots of the components of the signal outputted by the photodetector 46. This is accomplished by including in each of the PLLs 72 a preset entry unit 84 by which a person operating the imaging system 20 can enter the center frequencies of the respective frequency slots. By way of example, the preset unit 84 may apply an analog or a digital control signal to a preset terminal of the oscillator 82 in accordance with the mode of operation of the oscillator 82. The oscillator 82 is presumed to output a square-wave signal to the multiplier 78.

Each PLL 72 is provided with a counter 86 which counts clock pulses outputted by a clock 88, at terminal C, for measuring the frequency of the signal outputted by the oscillator 82. The timing unit 52 applies a gate signal to the counters 86 of the respective PLLs 72 for resetting the counters 86 prior to a measurement, and for storing each count in its counter 86 to be read by the multiplexer 76. By way of example, the counter 86 may count clock pulses over an elapsed time of one or more periods of the output signal of the oscillator 82 to obtain the period of the oscillator signal. Alternatively, the timing unit 52 may apply a gate signal establishing a measuring interval extending over many cycles of the oscillator output signal, and the counter 86 counts the number of cycles occurring during the measuring interval to obtain a measure of the frequency of the oscillator output signal. The count of each counter 86 is applied by the multiplexer 76 to an input terminal of the memory 50. The clock 88 drives the timing unit 52, the latter serving also to strobe the multiplexer 76 for reading the various counts.

An address generator 90 is driven by the timing unit 52 in synchronism with operation of the multiplexer 76 to address the memory to establish locations therein wherein the various counts are to be stored. In the multiplexed signal of the fiber optic link 44, there is concurrent transmission of one sensor sample from each of the columns 56. Data of the respective concurrently transmitted samples, as represented by the frequencies, or periods, of the respective samples, are outputted concurrently by the counters 86 of the respective PLLs 72. The timing unit 52 drives the multiplexer 76 to couple data of the samples from the counters 86 serially to the memory 50 in a predetermined sequence which corresponds with the addresses of the generator 90. This is repeated for the second sensor 26 of each column 56, the procedure continuing until all sensor data have been placed in the memory 50. By use of the bias circuit 64 (FIG. 2), each sensor is identified by a specific frequency. This enables the PLLs 72 to be preset more closely to the sensor frequency with a more rapid acquisition of the sensor frequency, and faster response of the communication system.

By way of alternative embodiments, the memory 50 can be replaced with a display system 50A for displaying a matrix of the pixels of the image at addresses in the matrix provided by the generator 90. The display 50A includes a computer responsive to addresses of the generator 90 for converting the frequency format of the data wherein the intensity of the display at each pixel is made proportional to the intensity of the image received at the detector assembly 22. Alternatively, the display system 50A may include a cathode ray tube including deflection circuitry operative in response to pixel addresses provided by the generator 90.

Figure 4:
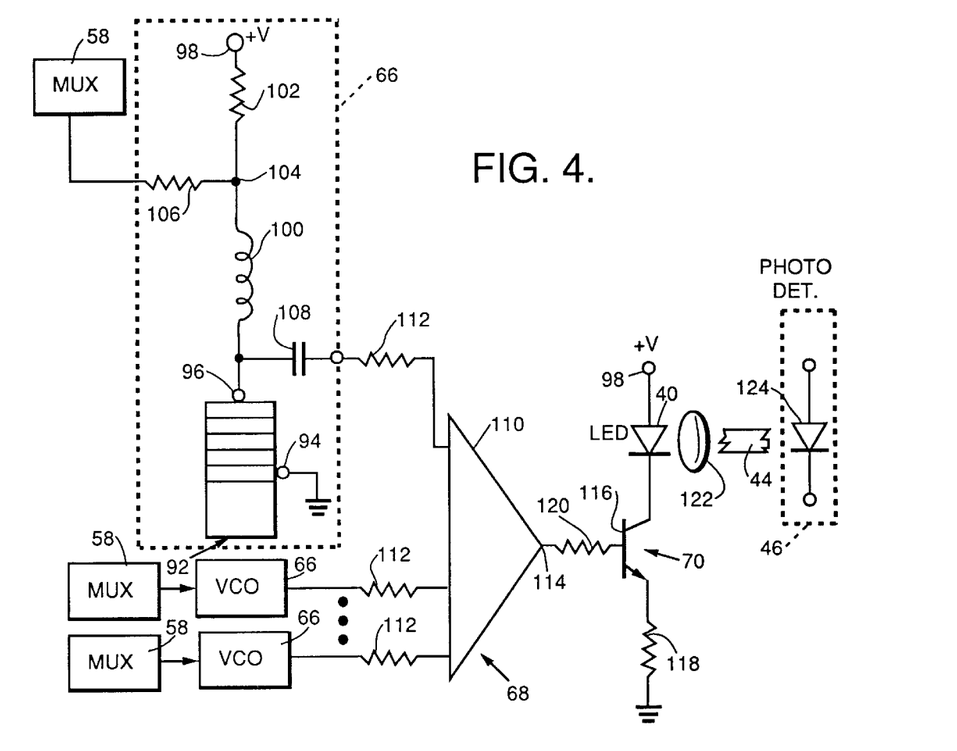
FIG. 4 shows circuitry of a set of voltage-controlled the oscillators (VCO) for signal modulation, the oscillators being employed with multiplexers of FIG. 2, and providing output signals which are coupled via an optical link of a communication system of the invention.

FIG. 4 shows circuitry in the construction of components of FIG. 2, these components being the oscillators 66, the summing unit 68, and the driver 70. By way of example, each oscillator 66 comprises a two-terminal device 92 constructed with multiple quantum wells to serve as an active element of the oscillator 66. The device 92 is grounded at one terminal 94 and, at a second terminal 96, is connected to a source 98 of positive voltage V via an inductor 100 and a resistor 102. The inductor 100 and the resistor 102 are serially connected between the source 98 and the terminal 96. At a node 104, located at a junction between the resistor 102 and the conductor 100, connection is made via a resister 106 to the output terminal of the multiplexer 58. An output signal of the oscillator 66 is attained at the terminal 96, and is outputted therefrom by a capacitor 108 to an output terminal of the oscillator 66. All of the oscillators 66 are constructed in the same fashion, and the frequency of oscillation in each of the oscillators 66 is established by the voltage and current impressed between the two terminals 94 and 96 of the device 92. The voltage and current applied via the terminals 94 and 96 is based on a combination of the voltage of the source 98 applied by the resistor 102 plus the voltage of the multiplexer 58 applied by the resistor 106. Thereby, the multiplexers 58 connected to respective ones of the oscillators 66 are able to establish separate values of frequency for the various oscillators 66. A typical value of the voltage of the source 98 is five volts. The inductor 100 serves as a choke to prevent the conduction of high frequency current to the source 98 and to the multiplexer 58.

The summing unit 68 comprises a multiple-input summing amplifier 110 and a set of input summing resistors 112 connecting between input terminals of the amplifier 110 and output terminals of respective ones of the oscillators 66. The composite signal comprising a sum of the signals outputted by the oscillators 66 appears at an output terminal 114 of the amplifier 110.

The driver 70 comprises a transistor 116, such as a bipolar transistor, a resistor 118 connected between an emitter terminal of the transistor 116 and ground, and a resistor 120 connected between a base terminal of the transistor 116 and the output terminal 114 of the amplifier 110. The LED 40 is connected between the collector terminal of the transistor 116 and the voltage source 98. In operation, the amplifier 110 supplies base current to the transistor 116 via the resistor 120. In response to the base current, the transistor 116 applies current to the LED 40 for activating the LED 40 to emit light. A lens 122 gathers light from the LED 40 and focuses the light upon an entrance pupil of the fiber optic link 44 for transmission to the photodetector 46. The photodetector 46 may comprise a PIN diode 124 positioned at an exit pupil of the optic link 44.

Figure 5:
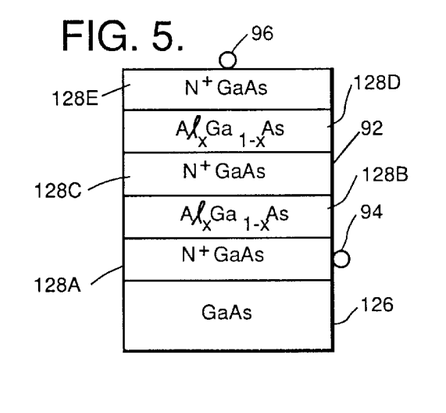
FIG. 5 shows a construction of an active element in a VCO in accordance with one embodiment of the invention.

FIG. 5 shows details in the construction of the multiple-quantum-well device 92. The device 92 comprises a substrate 126 of semi-insulating gallium arsenide. By way of example, five layers 128A–E of semiconductor material are disposed, one on top of the other, and supported by the substrate 126. The layer 128A is contiguous the substrate 126, and the layer 128E is most distant from the substrate 126. The layers 128A, 128C, and 128E comprise gallium arsenide, and the layers 128B and 128D comprise aluminum-gallium-arsenide. Formulas for these materials appear in FIG. 5. While only two of the layers of aluminum-gallium-arsenide are shown by way of example, it is understood that more layers may be employed. Each of the aluminum-gallium-arsenide layers has a thickness of approximately 150 angstroms. The thickness of the layer 128A is approximately 10,000 angstroms, the thickness of the layer 128C is approximately 50 angstroms, and the thickness of the layer 128E is approximately 5,000 angstroms. The layer 128E has the terminal 96, and the layer 128A has the terminal 94. During a state of oscillation of the device 92 in the circuit of FIG. 4, the oscillator 66 produces an RF (radio frequency) power of approximately 50 microwatts. While the multiple-quantum-well device 92 has been provided as a form of active element suitable for use in the construction of the oscillator 66, it is noted that the circuitry of the oscillator 66 should be selected in accordance with the environment of the housing 34. In the general case of the practice of the invention, numerous environments may be employed depending on the nature of the sensors 26 so that, in a general sense of practice of the invention, the environment may be warmer or colder than the external environment or may differ from the external environment in terms of some other characteristic such as pressure, by way of example. Also, the selection of oscillator circuit is based on convenience in packaging because a compact configuration facilitates the use of the invention in high resolution imaging systems wherein the sensors 26 are closely spaced. By way of example of an alternative construction of the oscillators 66, each of the oscillators may be constructed as a commercially available VCO made by SILICONIX under Part No. NE568N.

Figure 6:
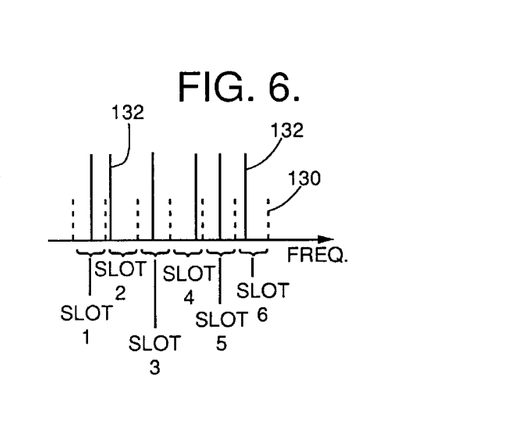
FIG. 6 shows a set of frequency slots employed in the frequency-multiplexing of the invention.

FIG. 6 shows a graph of the frequency spectrum of the various frequency components in the signal transmitted via the fiber optic link 44 of FIGS. 1,2, and 4. A plurality of frequency slots are indicated along the horizontal axis of the graph. Dashed lines 130 indicate edges of the various slots. Solid lines 132 indicate actual values of frequency of signals located within respective ones of the slots. In the situation wherein a separate slot is employed for each of the sensors 26 (FIG. 1), the location of a frequency (solid line 132) within a slot is indicative of the amplitude of the signal outputted by a sensor 26. Thus, by way of example, in the first and the third slots, the corresponding sensors 26 are outputting signals indicating a nominal value of radiation from the subject 30. By way of further example, in the second slot, the frequency has a value near the low-frequency edge of the slot indicating that the corresponding sensor 26 is outputting a relatively low value of signal in response to a low value of radiation intensity from the subject 30. Again, by way of example, in the fourth slot, the frequency has a value near the upper-frequency edge of the slot indicating a relatively high value of signal being outputted by the corresponding sensor 26 in response to a relatively high value of radiation intensity emanating from a point on the subject 30.

As has been disclosed hereinabove, each of the frequency slots may be employed, by way of an alternative embodiment of the invention, to identify a specific one of the columns 56 (FIG. 2), in which case a frequency line 132 is indicative of signal strength produced by one of the sensors 26 on the corresponding columns. A specific sensor 26 is identified by the position of a multiplexer 58 in the switching of a specific sensor channel to the output terminal of the multiplexer 58 in accordance with timing signals of the timing unit 52. Thereby, the timing unit 52 identifies the specific sensor 26 within the column 56, and the frequency slot identifies the respective columns. This provides complete identification of each signal in the optic link 44 with its corresponding sensor 26.

Figure 7:
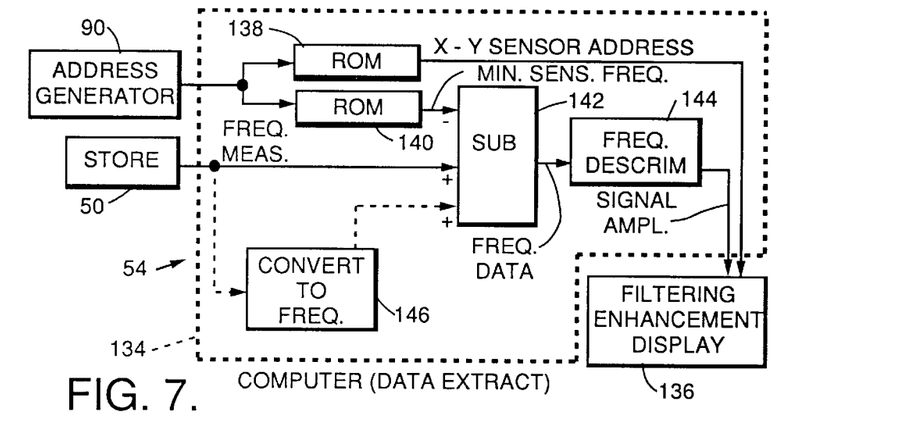
FIG. 7 is a block diagram providing details in the construction of an image processor of FIG. 1 for extracting data from a frequency modulated and multiplexed signal.

With reference to FIG. 7, the image processor 54 includes a computer 134 for extraction of data from the multiplexed signal transmitted via the optic link 44 (FIG. 1) and a processing unit 136 operative with signal outputted by the computer 134 for filtering and/or enhancing and/or displaying image data of the subject 30. The computer 134 includes two read-only memories (ROM) 138 and 140, a subtracter 142, a frequency discriminator 144, and an optional converter 146 of a measured period of oscillation to a frequency of oscillation. As described above, the counters 86 (FIG. 3) may be employed to measure either the frequency or the period of oscillation of the various modulated sensor signals. In the case of a frequency measurement, the frequency data is applied directly from the memory 50 to the subtracter 142. In the case of a period measurement, the memory outputs data via the converter 146 to the subtracter 142, the converter 146 providing a conversion of the period measurements to the corresponding values of frequency.

In operation, the memory 138 is addressed by the generator 90 to output the sensor locations in terms of row and column, or x–y, coordinates in the array 24 (FIG. 1), the location coordinates being applied to the processing unit 136 for use in displaying an image or for other functions of the processing unit 136. Also, in response to the addressing of the generator 90, the memory 140 outputs the values of the minimum modulation frequencies of the respective sensor signals. The minimum value of frequency of the modulation range for each sensor signal is subtracted by the subtracter 142 from the actual frequency supplied by either the memory 50 or the converter 146 to provide the frequency data for each sensor. The frequency data is applied by the subtracter 142 to the discriminator 144 to convert the frequency to a signal amplitude which is applied to the processing unit 136 for display of an image and/or for other functions of the processing unit 136. If desired, the discriminator 144 may comprise a ROM (not shown) for converting an input frequency, in the form of a memory address, to an output value of amplitude.

Figure 8:
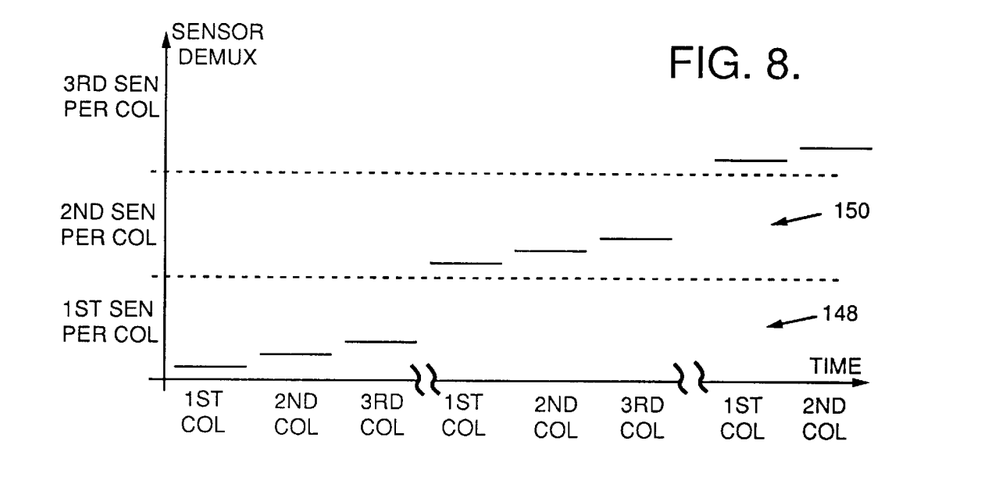
FIG. 8 is a timing diagram showing a process of demultiplexing signal received via a communication system of FIG. 1.

The timing diagram of FIG. 8 shows operation of the address generator 90 and the multiplexer 76 in cycling through the data transmitted via the optic link 44 for all of the sensors 26. As has been described above for the for the multiplexing operation of FIG. 2, the frequency bands of all of the columns 56 are transmitted concurrently with different bands, or slots, of the spectrum being reserved for each column. The multiplexers 58 select the signals of the sensors 26, one at a time, in the respective columns 56 such that the signals of the first sensor in each of the columns are transmitted first, followed by the signals of the second sensors in each of the columns, followed by signals of subsequent sensors in each of the columns. Demultiplexing is accomplished in an analogous fashion wherein, in response to timing signals of the timing unit 52, the address generator and the multiplexer 76 cycle through the signals of all of the first sensors in the respective columns, as shown in the bottom region 148 of the timing diagram. Thereupon, the cycle is repeated for the signals of all of the second sensors in the respective columns, as shown in the next region 150 of the timing diagram, with subsequent cycles retrieving data of the rest of the sensor signals in all of the columns.

The foregoing construction of the invention has demonstrated the use of a single signal transmission line to provide a rapid communication of signals from a multiplicity of detector elements, or sensors of radiation located at an inaccessible location to a location wherein the signals can be processed. The location of the detector assembly may be inaccessible by reason of a requirement of maintaining a temperature different from that of the external environment, or by reason of a physical location distant from the location of the signal processing apparatus.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. An imaging system comprising:
   a two dimensional array of sensors arranged in a plurality of groups for receiving electromagnetic radiation, said sensors in said array providing a plurality of sensor signals;
   a signal processing circuit for receiving the sensor signals and for providing processed sensor signals;
   a plurality of multiplexer means, each multiplexer means for multiplexing processed sensor signals for sensors in a corresponding group to provide a plurality of multiplexed sensor signals; and
   a plurality of oscillator means, each oscillator means being responsive to a corresponding multiplexer, said oscillator means for receiving said multiplexed sensor signals to provide a plurality of oscillator output signals that are frequency modulated:
   a communication link including means for summing together signals outputted by said oscillators into a composite signal and an image processor coupled to said communication link, said communication link including means for separating data of the respective sensors from the composite signal for presentation to the image processor; and
   means coupled to said separating means for storing an image of a subject viewed by said array of sensors;
   wherein each of the oscillators is operative in a predetermined frequency band which serves to identify a column of said array, a modulation of the frequency of an oscillator associated with said band providing data of radiation intensity from the subject received at a sensor.

2. An imaging system according to claim 1 wherein said communication link includes means for separating sensor signals from said composite signal, said separating means including a plurality of frequency-tracking filters operative in respective ones of said frequency bands for detecting the frequency modulations of respective ones of the sensor signals.

3. An imaging system according to claim 2 further comprising storage means coupled to said separating means, said storage means being operative in synchronism with said multiplexing means for accepting data of respective ones of said sensors from said plurality of frequency-tracking filters.

4. An imaging system according to claim 3 further comprising an image processor operative with image data stored in said storage means, and wherein said tracking filters are phase-locked loops.

5. An imaging system according to claim 2 further comprising display means coupled to said separating means and operative in synchronism with said multiplexing means for presenting an image of a subject viewed by said array of sensors.

6. An imaging system according to claim 2 further comprising display means coupled to said separating means for presenting an image of a subject viewed by said array of sensors.

7. An imaging system comprising:
   a two dimensional array of sensors arranged in a plurality of groups for receiving electromagnetic radiation, said sensors in said array providing a plurality of sensor signals;
   a signal processing circuit for receiving the sensor signals and for providing processed sensor signals;
   a plurality of multiplexer means, each multiplexer means for multiplexing processed sensor signals for sensors in a corresponding group to provide a plurality of multiplexed sensor signals; and
   a plurality of oscillator means, each oscillator means being responsive to a corresponding multiplexer, said oscillator means for receiving said multiplexed sensor signals to provide a plurality of oscillator output signals that are frequency modulated;
   where said oscillators are operated in different frequency slots.

8. The system of claim 7, further including means for causing said oscillators to operate in said different frequency slots.

9. The system of claim 7, wherein said sensor processing circuit includes means for adding a bias to said sensor signals such that said oscillators are operated in said different frequency slots.

10. The system of claim 7, further comprising means for mixing the outputs of said oscillators into a composite signal.

11. An imaging system comprising:
   a two dimensional array of sensors arranged in rows and columns, said sensors being operative to detect electromagnetic radiation and generate sensor signals in response to said detected electromagnetic radiation;
   means for processing said sensor signals into processed sensor signals; and a plurality of multiplexers associated with at least some of said columns, each said multiplexer functioning to multiplex said processed sensor signals for sensors in the associated column into a multiplexed signal; and a plurality of oscillators associated with said at least some columns, each said oscillator being responsive to the multiplexed signal from the associated multiplexer of the associated column to provide a frequency-modulated signal, said plurality of oscillators being operative at different frequency slots.

12. The system of claim 11, further comprising means for mixing the outputs of said oscillators into a composite signal.

* * * * *